A. LEYDEN.
Assignor to M. C. OGDEN.
Indicator Lock.
No. 9,747. Reissued June 7, 1881.
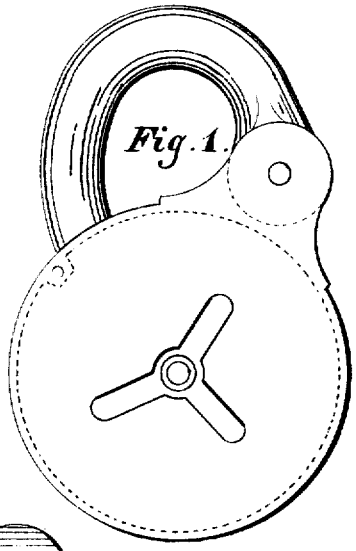
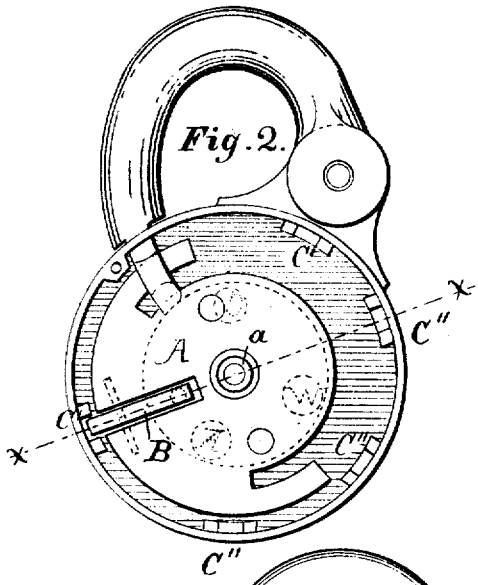
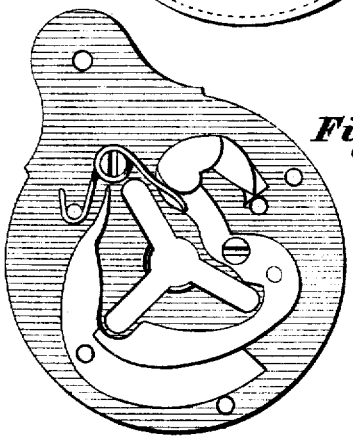
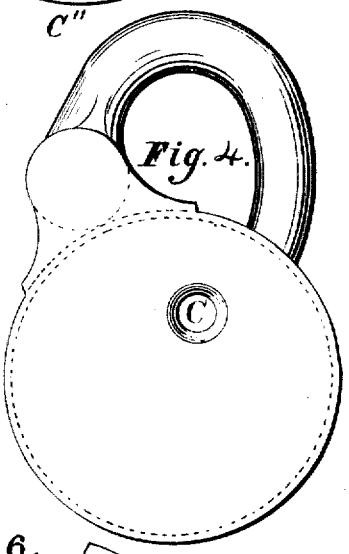
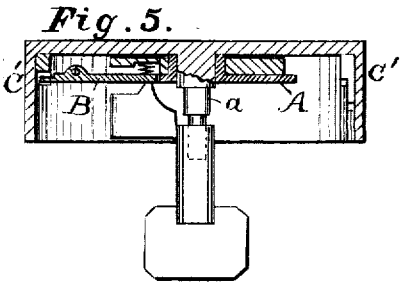
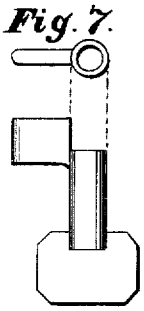
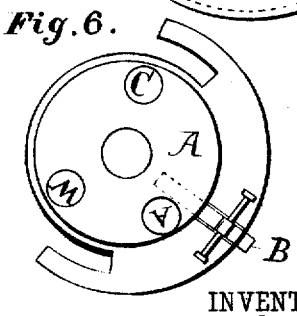
WITNESSES:
Thos. Houghton.
Edw. W. Byrn.
INVENTOR:
Austin Leyden
BY
ATTORNEYS.
N. PETERS, Photo-Lithographer, Washington, D. C.

UNITED STATES PATENT OFFICE.

AUSTIN LEYDEN, OF ATLANTA, GEORGIA, ASSIGNOR TO MORTIMER C. OGDEN, OF BROOKLYN, NEW YORK.

INDICATOR-LOCK.

SPECIFICATION forming part of Reissued Letters Patent No. 9,747, dated June 7, 1881.

Original No. 62,862, dated March 12, 1867. Application for reissue filed January 22, 1881.

*To all whom it may concern:*

Be it known that I, AUSTIN LEYDEN, of Atlanta, in the county of Fulton and State of Georgia, have invented a new and useful Improvement in Indicator-Locks; and I do hereby declare that the following is a full, clear, and exact description of the same, reference being had to the accompanying drawings, forming part of this specification.

My invention consists in constructing a lock in such manner that in applying it to freight-cars of railroads and to similar purposes the car may be locked for through-freight, and the destination of the car be indicated by a letter shown on the lock, and so that a way-freight key for the same lock will not open it, as will be hereinafter described.

Figure 1 represents the key-hole side of the lock. Fig. 2 represents the lock with the cap or key-hole side off, showing the parts of the lock which are operated by the through-freight key. Fig. 3 shows the key-hole side turned over and the parts of the lock which are operated by the way-freight key. Fig. 4 shows the back side of the lock, as when applied to a car destined to Chattanooga, for instance, the terminus of a railroad-route. Fig. 5 is a cross-section of Fig. 2 through the line *x x*, showing the through-freight key. Fig. 6 shows the disk-bolt; and Fig. 7 shows the way-freight key—a side and an end view.

This lock is really a double lock in one shell, each part having its own key, and it is so arranged that neither key will operate the lock in the other's place. One key operates it for through-freight and the other for way-freight.

A represents the disk-bolt. This is turned upon its center *a* by the through-freight key. (Seen in Fig. 5.) The letters A C W, as seen in dotted lines in Fig. 2, are upon its other side, and when the disk is turned and locked by the key one of the letters comes opposite the hole through the back of the lock, as seen in Fig. 4.

B is a latch attached to the disk. There is a small spiral spring under the inner end, as seen in Fig. 5.

C′ C″ are catches attached to the shell of the lock. The disk A cannot be turned by the key until the end of the latch is lifted out of the catch.

The through-key has a little projection for bearing upon the spring end of the latch and pressing it down, and thereby elevating the other end and lifting it out of the catch, as seen in Fig. 5. In this example of my invention the lock is locked when the latch is at the two catches marked C′. When the latch is at C″ it is not locked by the through-key, and the letter shown on the back is W, indicating way-freight. When the lock is used in this way it is locked by the other or way key.

The parts which this key operates are attached to the under side of the cap or key-hole side of the lock, and seen in Fig. 3. There is nothing novel or peculiar to this portion, it being similar to the ordinary padlock. The key which operates it will not operate the through-freight lock, as already stated, but the bolts of each lock take hold of the same shackle. The shackle does not have a hole at the end, as is usual with the shackles of padlocks, but there are notches or recesses on the sides of the shackle, in which the bolt rests when the lock is in use.

In pointing out some of the advantages of my lock it will be seen that the indicator-wheel, or disk with indicating-letters on it, is hung upon the key-pin *a*, and circumscribes the axis of the same, thus giving to the key-pin the double function of holding these parts as a central support, and also of centering the key. This secures a great advantage, in that the location of said pin inside the periphery of the indicator-wheel simplifies the construction of an indicator-lock, (which from its very nature is more or less complex,) and allows the case of the lock to be restricted to its smallest possible compass. By rigidly connecting the indicator-disk and the locking-bolt A it will be seen, also, that the locking of the shackle or unlocked condition of the same by bolt A is always insured, according to the character or letter exposed through the case.

Having thus described my invention, what I claim as new is—

1. An indicator-lock consisting of the combination of a case having an opening in the same for the exposure of the indications on the wheel, a locking mechanism, and an indicator-wheel hung concentrically upon the key-pin, substantially as shown and described.

2. In an indicator-lock, the combination of the case having the opening in the same, the indicator-wheel arranged within the case, and the bolt rigidly connected to the indicator-wheel.

3. The disk-bolt A, constructed substantially as described, with indicating-letters upon one side and the latch B attached to the other side, and operating substantially as herein shown and described.

4. The catches C′ C″, attached to the shell of the lock, substantially as described, in combination with the disk-bolt A and latch B, for the purposes specified.

AUSTIN LEYDEN.

Witnesses:
JAMES C. MIX,
EDWARD CALLAWAY,
G. H. TANNER.

Correction in Reissued Letters Patent No. 9,747.

It is hereby certified that at the time Reissued Letters Patent No. 9,747, were granted to Mortimer C. Ogden, of Brooklyn, N. Y., as assignee of Austin Leyden, June 7, 1881, for an improvement in "Indicator Locks," there was on record in this Office (Liber F 26, page 203,) an assignment from said Ogden of his entire interest to the Eagle Lock Co., of Terryville, Conn., and that the patent should have been issued to the said Eagle Lock Co. instead of to said Ogden; that the proper corrections have been made in the files and papers relating to the case in the Patent Office, and are hereby made in said Letters Patent to make the title therein conform to the records of the Patent Office.

Signed, countersigned, and sealed this 14th day of June, A. D. 1881.

[SEAL.]

A. BELL,
*Acting Secretary of the Interior.*

Countersigned:

E. M. MARBLE,
*Commissioner of Patents.*